Figure 1:
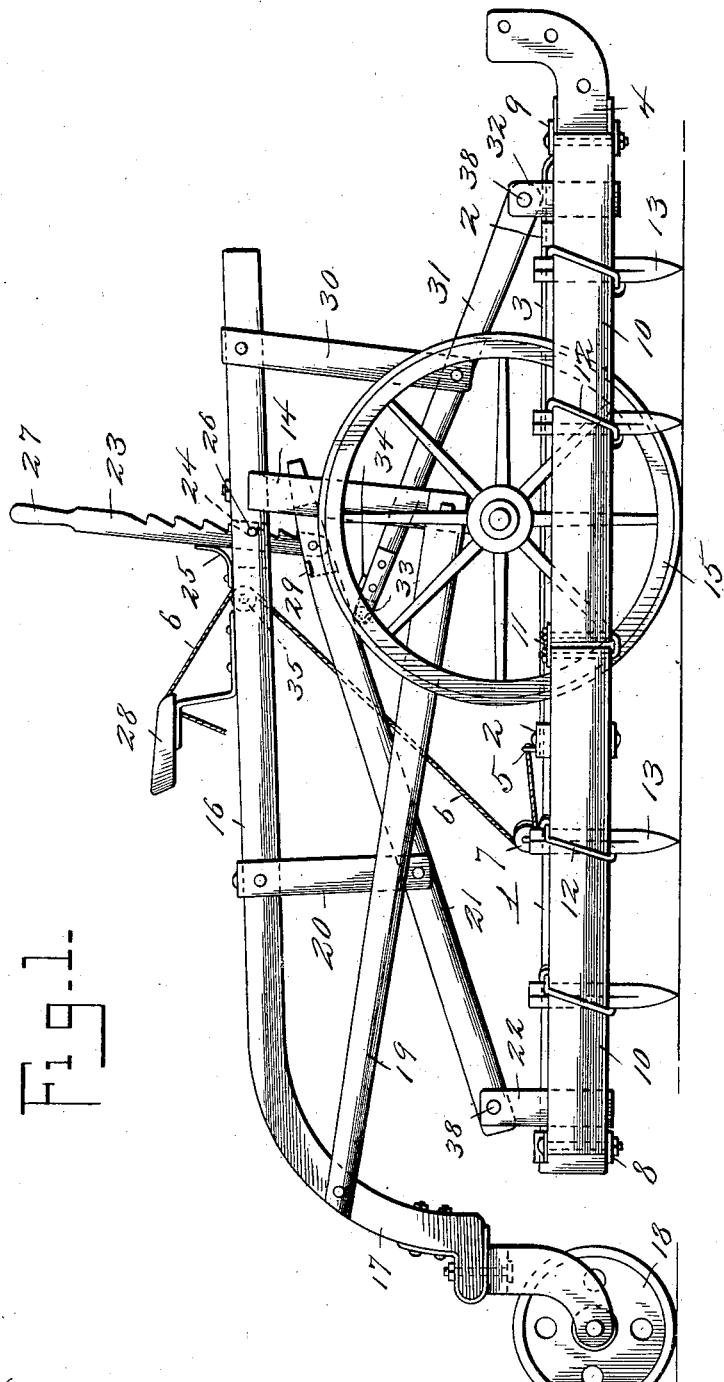

No. 762,173. PATENTED JUNE 7, 1904.
L. J. KNIGHT.
HARROW AND CULTIVATOR.
APPLICATION FILED SEPT. 15, 1903.
NO MODEL.
4 SHEETS—SHEET 1.

Witnesses
Harry L. Amer.
Herbert D. Lawson

Inventor
Levi J. Knight.
By Victor J. Evans Attorney

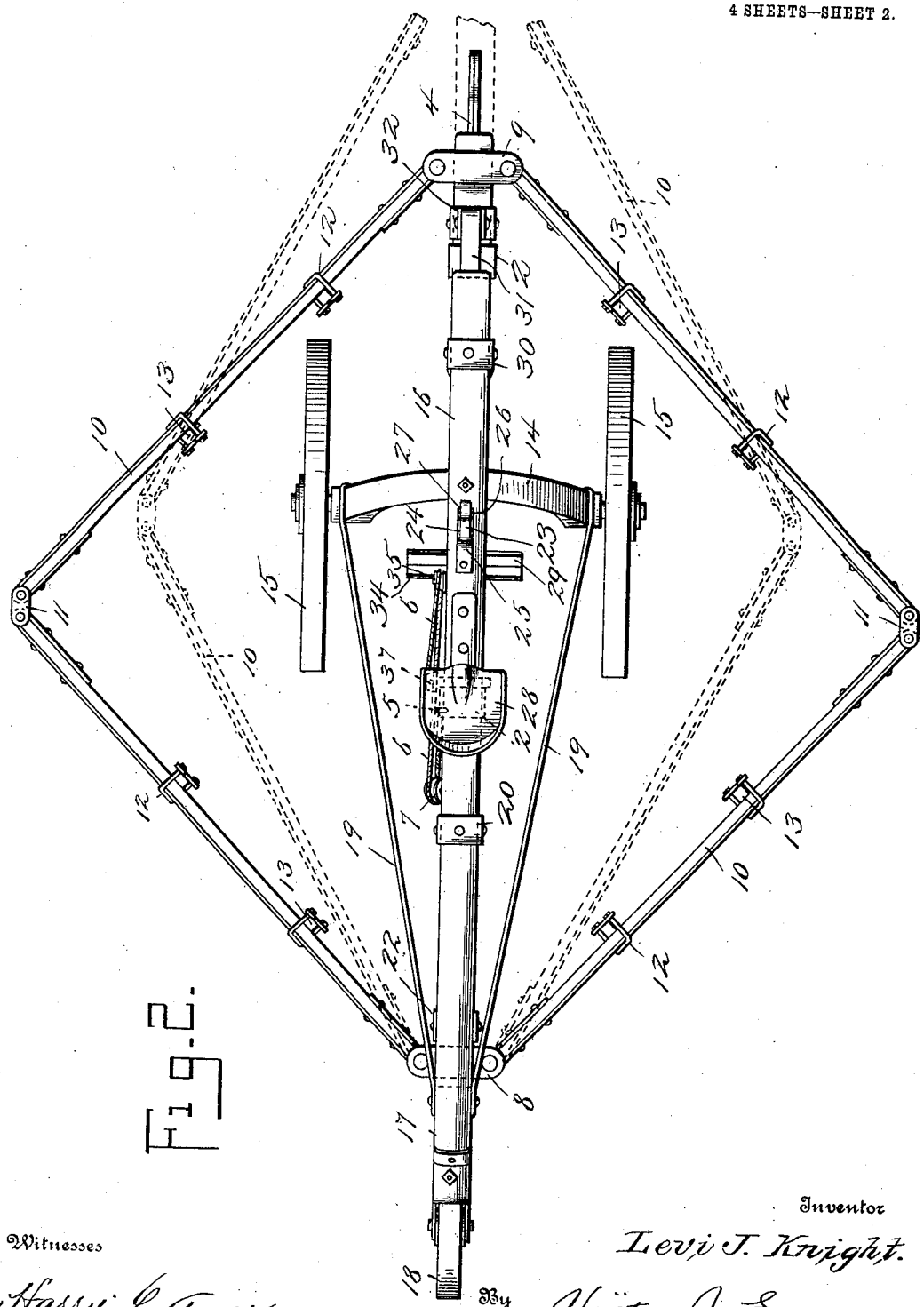

No. 762,173. PATENTED JUNE 7, 1904.
L. J. KNIGHT.
HARROW AND CULTIVATOR.
APPLICATION FILED SEPT. 15, 1903.
NO MODEL. 4 SHEETS—SHEET 3.
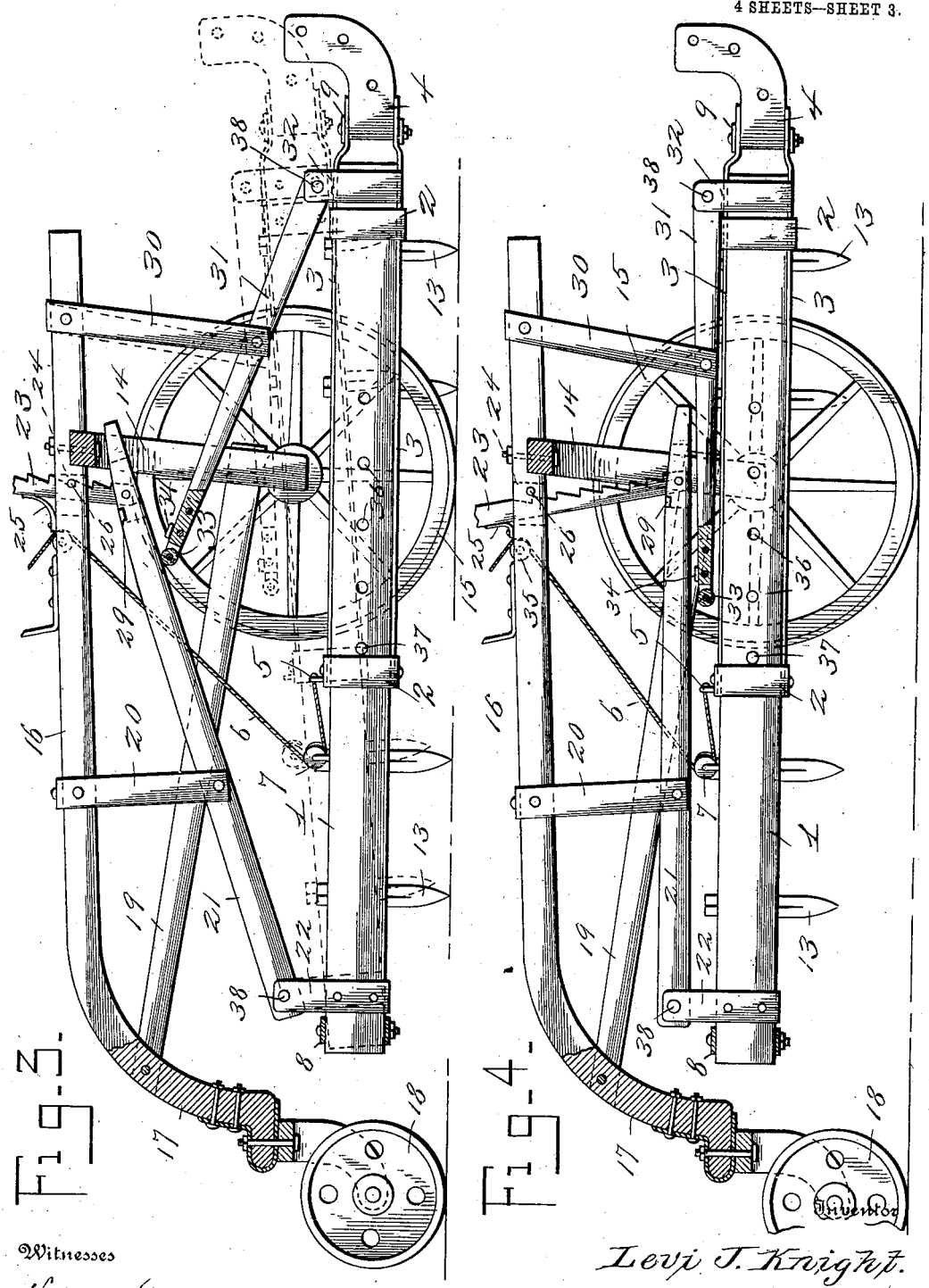
Witnesses
Harry L. Amer.
Herbert D. Lawson.
Inventor
Levi J. Knight.
By Victor J. Evans
Attorney

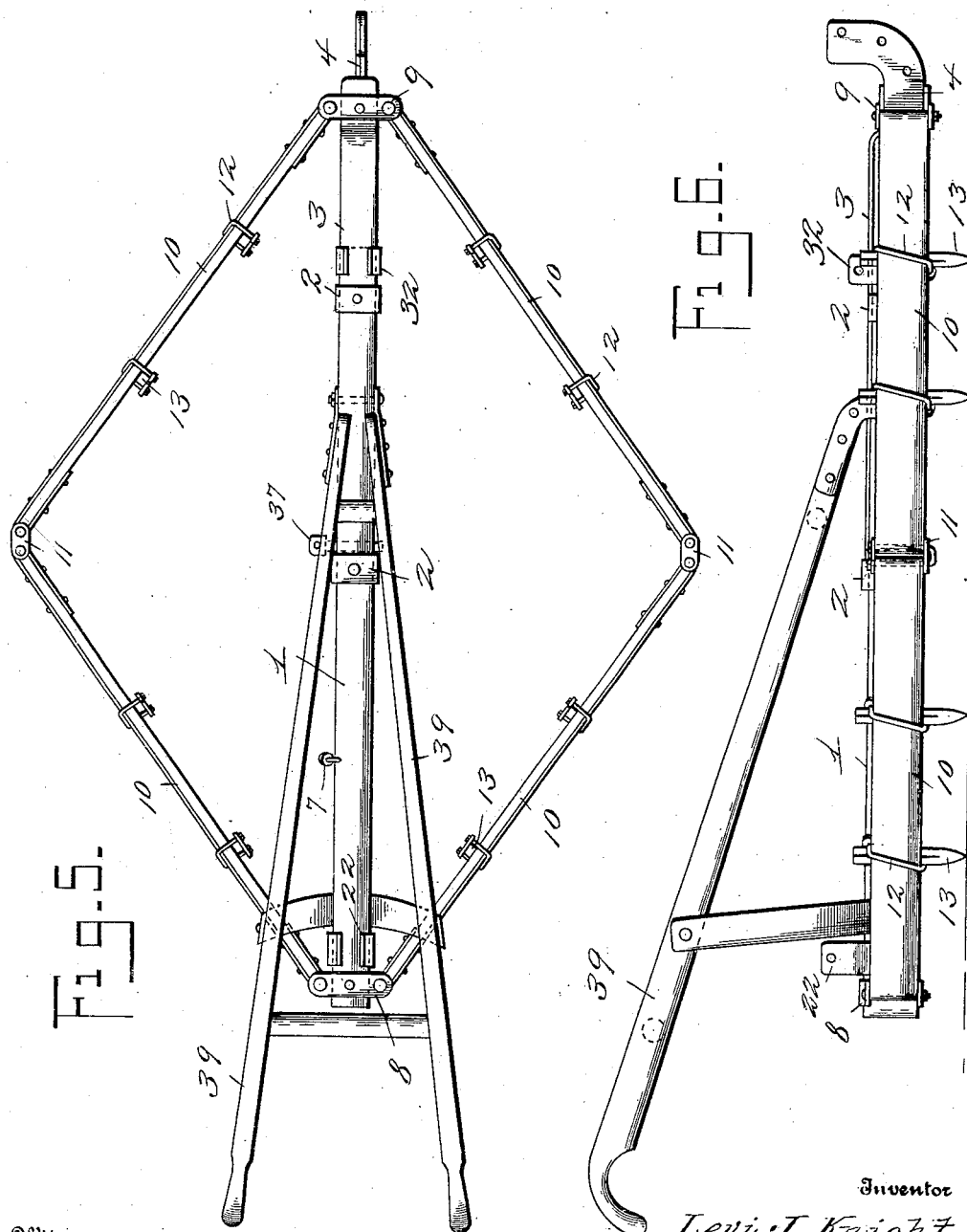

No. 762,173. Patented June 7, 1904.

UNITED STATES PATENT OFFICE.

LEVI J. KNIGHT, OF BRAIDENTOWN, FLORIDA.

HARROW AND CULTIVATOR.

SPECIFICATION forming part of Letters Patent No. 762,173, dated June 7, 1904.

Application filed September 15, 1903. Serial No. 173,308. (No model.)

*To all whom it may concern:*

Be it known that I, LEVI J. KNIGHT, a citizen of the United States, residing at Braidentown, in the county of Manatee and State of Florida, have invented new and useful Improvements in Harrows and Cultivators, of which the following is a specification.

My invention relates to new and useful improvements in harrows; and its object is to provide a machine of this character which can be used either as a riding or drag harrow and cultivator.

A further object is to provide means whereby one or both ends of the harrow may be raised from the ground a desired distance without necessitating the stopping of the machine.

Another object is to provide means whereby the width of the machine may be increased or diminished, as desired.

With the above and other objects in view the invention consists in providing a harrow formed of a centrally-arranged beam, to the opposite sides of which are hinged side bars of a harrow-frame, said bars being pivoted together and provided with teeth, plows, or other suitable cultivating-tools. The yoke is arranged above the longitudinal bar of the machine and is mounted upon traction-wheels, and this yoke is supported in an upright position by means of a tongue which is supported in rear of the harrow by means of a caster connected thereto. Adjusting-bars are pivotally secured to the longitudinally-extending bar and are adapted to be depressed singly or together, so as to raise one or both ends of the harrow.

The invention also consists in the further novel construction and combination of parts hereinafter more fully described and claimed, and illustrated in the accompanying drawings, showing the preferred form of my invention, and in which—

Figure 1 is a side elevation of the harrow. Fig. 2 is a top plan view thereof. Fig. 3 is a longitudinal section therethrough and showing in dotted lines one end of the harrow raised. Fig. 4 is a similar view, the entire harrow being shown raised from the ground. Fig. 5 is a plan view of the harrow with the riding-gear removed, and Fig. 6 is a side elevation thereof.

Referring to the figures by numerals of reference, 1 is a centrally-arranged longitudinally-extending beam having sleeves 2 slidably mounted thereon, which are connected by means of bars 3 with a plate 4, to which a whiffletree (not shown) is adapted to be connected. On one of the sleeves 2 is arranged a loop 5, to which is fastened a flexible strip 6, extending under a pulley 7, journaled on the beam 1. Ears 8 extend from the outer end of the beam 1, and similar ears 9 extend laterally from the plate 4. To each pair of ears 8 and 9 is hinged a side bar 10, two side bars being arranged at each side of the beam 1. These side bars are pivoted together by means of links 11, which connect their outer ends, and yokes 12 are arranged on the bars and form securing means for fastening teeth 13 upon the bars. It will be understood that in lieu of harrow-teeth plows, colters, sweeps, or any other suitable tools can be employed in connection with the machine.

A yoke 14 extends over the beam 1 and is supported by traction-wheels 15, which are located between the beam 1 and the side bars 10. Mounted on this yoke is a tongue 16, which is curved downward in rear of the harrow, as shown at 17, and is supported at its outer end by a caster 18, which is pivoted thereto. Brace-rods 19 extend from the rear portion of the tongue to the sides of the yoke. A hanger 20 is fastened to the tongue 16 at a point above the rear portion of the harrow, and pivoted upon this hanger is a lever 21, the rear end of which is pivoted in a bracket 22, extending upward from the rear portion of beam 1. The other end of lever 21 has a rack 23 pivoted thereto and slidably mounted within an aperture 24, formed in tongue 16. This rack is held, by means of a spring 25, normally in engagement with pin 26, located in aperture 24, and a handle 27 is formed at the upper end of the rack and is located adjacent to a seat 28, arranged upon the tongue 16. Arms 29 extend laterally from the lever 21 at points near the rack 23 and form rests for the feet of the operator occupying the seat 28.

A hanger 30 is arranged upon the forward end of the tongue 16, and within its lower end is fulcrumed a lever 31, which is pivoted at its outer end within a bracket 32, extending upward from the forward ends of the bars 3. The inner end of the lever 31 has a roller 33 journaled therein, which is held by the weight of the harrow normally in contact with the under surface of lever 21. This lever 31 also has laterally-extending arms 34, which form foot-rests for the operator. The flexible strip 6, hereinbefore referred to, extends upward to the tongue 16 and over a pulley 35, journaled thereon, and is brought to a point adjacent to seat 28, where it can be readily grasped. The beam 1 is provided with a series of apertures 36, any one of which is adapted to receive a pin 37, which serves to retard the movement of the sleeves 2 in one direction.

In using the harrow the same can be adjusted to different widths by removing the pin 37. The forward pull by the draft-animals upon the machine will therefore cause the sleeves 2 and the bars 3 to slide forward on beam 1, and as the side bars 10 are pivoted to said beam and to the plate 4 it is obvious that the points of connection between the side bars will be drawn inward toward the beam, and this inward movement will be in proportion to the distance the sleeves 2 are drawn upon the beam 1. After the desired width of the harrow has been obtained the pin 37 can be inserted in one of the apertures 36, so as to prevent further longitudinal movement of the sleeves 2. To return the side bars to their normal positions, or, in other words, to increase the width of the harrow, it is merely necessary for the operator to draw upon the flexible strip 6, and as this strip is connected to one of the sleeves 2 it will be understood that both of the sleeves and the bars 3 will be drawn on the beam 1 and the points of connection between the side bars 10 will be moved laterally in opposite directions. Where it is desired to raise one end of the harrow, the operator places his feet upon the arms 34 of lever 31, and as this lever is fulcrumed at a point between its ends it is obvious that the bracket 32 will be swung upward, carrying therewith the front end of the harrow. In order to raise the entire harrow for the purpose of moving it away from obstructions in its path, the feet of the operator can be placed on the arms 29 and said arms depressed. The lower end of lever 21 will, as is obvious, be forced upward, thereby raising the rear end of the harrow, and at the same time the upper end of said lever 21 will bear upon roller 33 and swing the lower end of lever 31 upward, thereby raising the front of the harrow. The parts can be locked in this position by placing the rack 23 in engagement with pin 26. When it is desired to drop the harrow into operative position, the rack 23 is drawn backward against spring 25 and permitted to move upward in the opening 24 and the parts then returned by gravity to their normal positions.

When it is desired to use this machine as a drag-harrow, the levers 21 and 31 can be detached from the brackets 22 and 32, respectively, by withdrawing the pins 38, which are employed for securing these levers to these brackets. After these levers have been detached the wheels 15, yoke 14, tongue 16, and the parts connected thereto can be removed and handles 39 fastened to beam 1. I have shown this construction in Figs. 5 and 6. With this arrangement the width of the harrow can be regulated in the manner hereinbefore described; but it will of course be understood that the hoisting mechanism is dispensed with. It will be seen that the harrow is very simple in construction and can be quickly adjusted either horizontally or vertically without the necessity of the operator leaving the seat 28. In lieu of providing a single caster 18, such as shown, a double caster may be employed or any other suitable supporting device used.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus fully described the invention, what is claimed as new is—

1. In a machine of the character described, the combination with a beam; of a sleeve slidably mounted thereon, a plate, sliding bars connecting the plate with the sleeve, side bars pivoted together and arranged at opposite sides of the beam, said side bars being pivoted at their inner ends to the beam and sliding bars, respectively.

2. In a machine of the character described, the combination with a tongue and means for supporting the same; of a beam below the tongue, bars slidably mounted upon the beam, side bars connected to the beam and sliding bars, a hanger depending from the tongue, and a hoisting-lever connected to the beam and fulcrumed in the hanger.

3. In a machine of the character described, the combination with a tongue and the means for supporting the same; of a beam below the tongue, bars slidably mounted upon the beam, pivotally-connected side bars secured to the beam and sliding bars and adapted to be extended or retracted laterally thereby, levers supported by the tongue and connected to the beam, and means for simultaneously operating the levers for raising the beam.

4. In a machine of the character described, the combination with a tongue and means for supporting the same, of a beam below the tongue, bars slidably mounted upon the beam, side bars pivoted together and to opposite sides of the beam and sliding bars, a lever supported by the tongue and pivoted to the beam, a second lever supported by the tongue and connected to the beam, said lever bearing on the first-mentioned lever, and laterally-extending arms upon the levers.

5. In a machine of the character described, the combination with a tongue, having an aperture therein, and means for supporting the tongue; of a beam under the tongue, bars slidably mounted upon the beam, side bars pivotally connected to each other and to the sides of the beam and sliding bars, hangers depending from the tongue, levers fulcrumed therein and pivoted to opposite ends of the beam and sliding bars, a roller journaled in one of the levers and forming a bearing for the other lever, and a rack pivoted to one of the levers and adjustably mounted within the aperture in the tongue.

6. In a machine of the character described, the combination with traction-wheels, and a yoke supported thereby, of a tongue upon the yoke, hangers depending from the tongue, levers fulcrumed therein, a roller journaled in one of the levers and forming a bearing for the other lever, means for simultaneously depressing the levers, a beam pivotally connected to the levers, an extension slidably mounted upon the beam, side bars pivotally connected to each other and to the sides of the beam and extension, and means for adjusting the extension upon the beam.

In testimony whereof I affix my signature in presence of two witnesses.

LEVI J. KNIGHT.

Witnesses:
HERBERT D. LAWSON,
GEORGE M. BOND.